Patented May 4, 1943

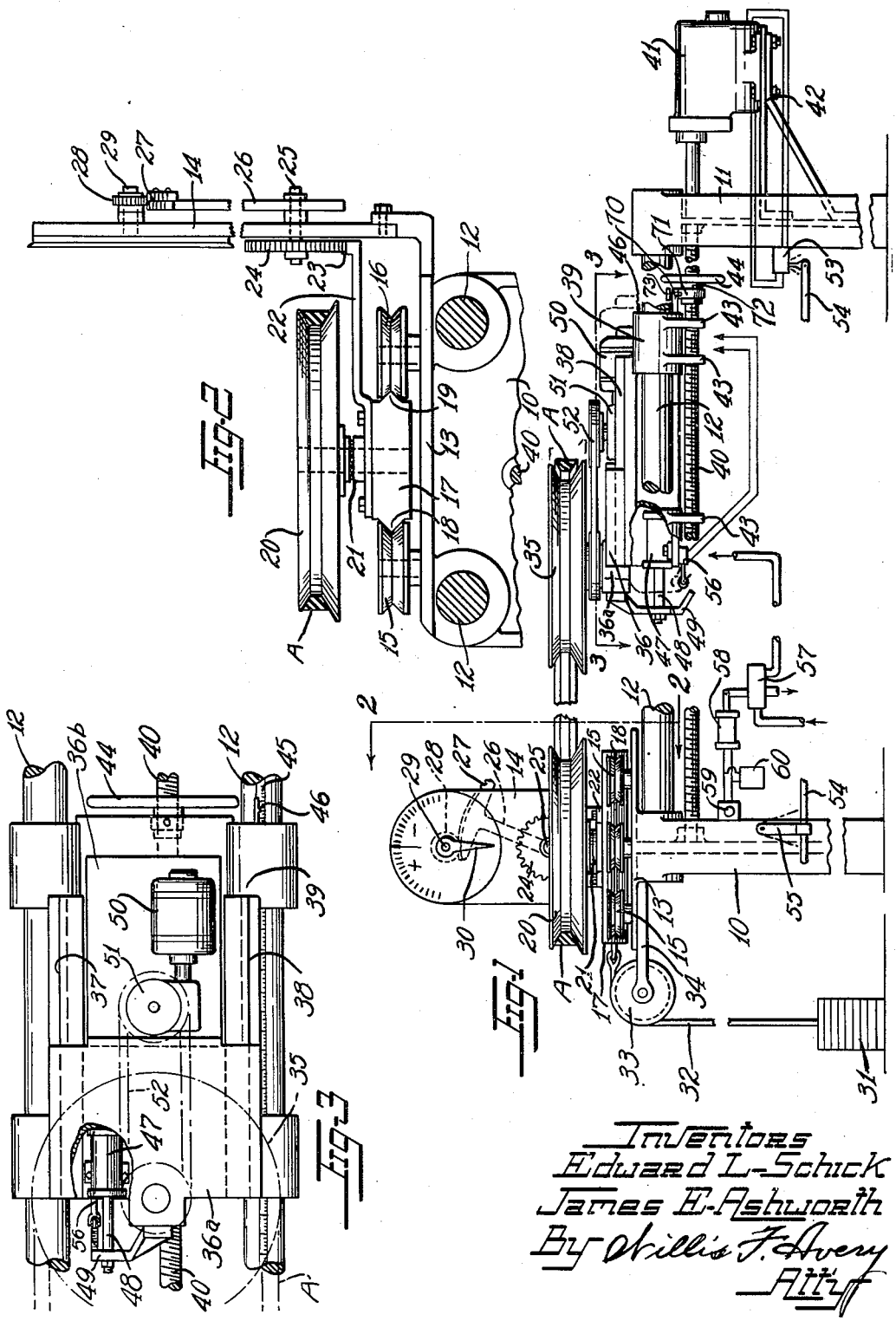

2,318,530

UNITED STATES PATENT OFFICE 2,318,530

BELT-MEASURING APPARATUS

Edward L. Schick and James E. Ashworth, Cuyahoga Falls, Ohio, assignors to The B. F. Goodrich Company, New York, N. Y., a corporation of New York Application August 8, 1940, Serial No. 351,864

4 Claims. (Cl. 73—51)

This invention relates to apparatus for measuring endless power transmission belts, especially such belts of the side-driving type, wherein best results in the matching of belts for multiple-sheave use is obtained by accurate measurement of the pitch lines of their driving faces, a measurement difficult of accurate determination except in association of the belts in their properly grooved pulleys while under load.

The chief objects of the invention are to provide for conveniently and accurately measuring the belts, to provide for quick and convenient changeability of the apparatus to suit belts of different cross sections and driving face angles, to provide for power operation for shifting the apparatus, and to provide for an automatic sequence of operation as to some functions.

These and further objects will be apparent from the following description, reference being had to the accompanying drawing, in which:

Fig. 1 is an elevation of apparatus constructed according to and embodying the invention, parts being broken away and sectioned and electrical and fluid operating connections being shown diagrammatically.

Fig. 2 is a section taken along the line 2—2 of Fig. 1.

Fig. 3 is a section taken along the line 3—3 of Fig. 1.

In general, the apparatus of the invention comprises adjustable and interchangeable pulley sheaves for receiving between them a power transmission belt of the side-driving type for measurement. Provision is made for measuring accurately the distance between such pulleys, and by using pulleys suited to the particular belt under measurement, the pitch circumference of the side-driving faces of the belt may be accurately determined. One sheave is movable and weighted for applying a determinate load, while the other sheave is anchored but nevertheless movable intermittently to facilitate the mounting and detachment of the test belt. Provision is made for rotating the belt to be measured a determinate number of revolutions while under load to loosen the belt structure, remove kinks and also remove some stretch of the belt. Visual indicator means is provided for quickly noting the amount of deviation from standard of a belt being measured, which notation is useful for comparison in matching belts for particular driving installations.

Referring to the drawing, the apparatus is supported upon a frame comprising legs 10, 11 having horizontal supporting rods 12, 12. The leg 10 supports a bracket 13 having an upright indicator support 14. The bracket 13 supports two rows of pintles supporting for rotation upon vertical axes two rows of grooved wheels 15, 15 and 16, 16. A traveling block 17 having guide edges 18, 19 riding in the grooves of the wheels 15 and 16, respectively, supports for rotation upon a vertical axis a pulley sheave 20, an anti-friction thrust bearing 21 being provided for the rotational support of such sheave 20. Also carried by the block 17 is an arm 22 supporting a rack 23 which meshes with a pinion 24 mounted upon a shaft 25 extending through and journaled in the indicator support 14. At the rear of the indicator support, the shaft 25 is secured to an arm 26 having at its upper end a rack 27 meshing with a pinion 28 secured to a stud shaft 29 which extends through the support 14 and carries at its other end an indicator hand 30. The rack 27 may be of any suitable form preferably adapted to eliminate back lash, and for this purpose may be of the divided construction shown in Fig. 2.

The traveling block 17 is urged toward the left in Fig. 1, by weights 31 of predetermined amount connected to the block 17 by means of a cable 32 passing over pulley 33 supported upon an extension 34 of the bracket 13.

In the position of the parts shown in Fig. 1, the weights 31 rest on the floor and the traveling block 17 and indicator hand 30 accordingly have been drawn far to the left. In the condition of the parts for operation, the sheave 20 and block 17 are urged to the right by pull upon the belt to be measured against the force of the weights 31 which are thus raised from the floor, and the indicator hand 30 is brought to an upright position or nearly so, the upright position being neutral for a belt of proper size.

A side-driving or V-belt whose circumference at the pitch line is desired to be measured, is indicated at A. In Fig. 1 such belt A is shown applied to the sheave 20 and extending to the right with its other end loose about a sheave 35. The sheave 35 also is mounted upon an anti-friction thrust bearing for rotational support of such sheave upon a sub-carriage 36, which sub-carriage 36 is slidable upon tracks 37, 38, of a main carriage 39 slidable at its four corners upon the rods 12, 12 of the frame. The main carriage 39 is shiftable along the rods 12, 12 by means of a central screw rod 40 extending the full length of the apparatus from the leg 10 through the leg 11 into driving communication with a motor 41 mounted upon a bracket 42 secured to the leg 11.

For adjusting the main carriage 39, an arm 70 is provided with a horizontal bearing 71 in which a quill 72 is rotatably mounted, the quill being flanged at each end to prevent axial movement thereof. The quill is threaded internally to engage the threads of the screw 40 and has a hand wheel 44 formed integrally therewith whereby it may be rotated. Rotation of the quill is normally prevented by a pin 73 slidably fitted in the arm 70 and entering an opening in the quill 72. The carriage 39 may be adjusted by operating the motor 41 to operate the screw 40. Lugs 43 on the carriage clear the screw 40 and act as guides. Fine adjustment of the carriage may be made by pulling the pin 73 and rotating the quill 72 by the hand wheel 44. By using the power adjustment for great distances, and then hand adjustment for more refined movements, the carriage 39 may be quickly and accurately adjusted throughout a great range of adjustments, the apparatus being of any desired length, and the carriage 39 may be positioned accurately at any desired distance from the other end of the machine, which distance may be indicated by markings 45 along one of the rods 12 (Fig. 3), and an indicator 46 carried by the carriage 39.

The sub-carriage 36 is mounted for limited sliding movement upon the tracks 37, 38 of the main carriage for the purpose of facilitating the putting on and taking off of the belt to be measured. In the position of Fig. 1 the sub-carriage 36 is shown at the position of its left hand movement where the belt A is slack upon the sheave 35. The sub-carriage 36 is movable to the right a limited extent upon carriage 39 to bring sheave 35 to its belt-engaging position. This movement is effected by means of a fluid-pressure cylinder 47 mounted upon the carriage 39 and having a piston rod 48 extending to the left as seen in Figs. 1 and 3 and connecting to a bracket 49 secured to the sub-carriage 36.

The sub-carriage has an elevated portion 36a and a depressed portion 36b, the latter being located between the rods 12, 12 and supporting a motor 50 having a driving connection through a reducing gear 51, and a belt 52 with corresponding sheaves to drive the sheave 35.

Connections are provided for fluid-pressure and electrical operation under convenient manual control, the operation being automatic as to some of its phases.

A starting, stopping and reversing switch 53 for the motor 41 is mounted on the leg 11 and has an associated control rod 54 extending the length of the machine and mounted for swinging movement at 55 upon the leg 10, this rod being conveniently accessible to the operator of the machine at any position along the same. The switch 53 has connections to the motor 41 so that it may be driven in either direction to adjust the carriage 39 to the correct position for a particular belt to be tested which position is indicated by the indicator 46 with reference to the scale 45.

An on-off switch 56 is mounted adjacent the fluid-pressure cylinder 47 for cooperation with the bracket 49, this switch having electrical connections to the motor 50 for rotating the sheave 35 to drive the belt A for a few revolutions at the time the sub-carriage 36, upon which the bracket 49 is mounted, is urged to its right-hand position.

Operation of the cylinder 47 to urge the sub-carriage to the right is controlled by a pressure-fluid valve 57 suitably piped to the cylinder 47 and to a source of fluid-pressure, the valve 57 being operated by a solenoid 58 connected electrically to a push button 59 and also to a timer 60, which timer is operative to disconnect the solenoid after a given interval of time, equivalent to a predetermined number of revolutions of the motor 50, whereupon operation of the cylinder 47 to force the sub-carriage to the left will disconnect the motor 50 by reason of the opening of switch 56.

In preparing the apparatus for measuring the belt A, the center-to-center distance between sheaves 20 and 35 is adjusted so that this distance is as it is called for by the specification for the particular belt. The indicator 46 on the carriage 39 gives an accurate indication of such specified distance when sheave 35 is urged fully to the right with relation to carriage 39 and the sheave 20 is centrally positioned upon its support so that the indicator reads neutral.

From the foregoing description it will be seen that upon movement of the traveling block 17 to the left (Fig. 1), the indicator hand 30 will be caused to swing to the left, or counter-clockwise, from its zero or neutral position, uppermost, indicative of an overlength belt. Likewise, movement of the block 17 to the right and a corresponding shift of the hand 30 to the right indicates a shorter belt, assuming of course a definite setting of the other parts of the apparatus.

The preferred steps used for testing and matching belts will now be described. With the parts in the position of Fig. 1, a belt A is applied loosely over the sheaves 20 and 35, the carriage 39 and the indicator 46 having been adjusted to the proper position for this general size of belt, and the sheaves 20 and 35 having been selected to suit the particular width of the belt and the angles of its driving faces. The sheaves 20 and 35 may have their lower flanges extended, as shown to hold the loosely applied belt.

The weights 31 normally urge the sheave 20 to the left and the hand 30 off its uppermost or neutral position. Now, upon pressing push button 59 solenoid 58 is operated to allow pressure fluid to pass through valve 57 into the operating cylinder 47. Operation of this cylinder urges sub-carriage 36 to the right bringing the load 31 upon the belt A which is now in its proper driving relation with the sheaves. Closing of switch 56 by contact therewith of bracket 49 starts motor 50, which in turn drives sheave 35 for a timed interval, after which the timing element 60 disconnects the solenoid 58, causing a return movement of the pressure fluid cylinder 47. This in turn opens switch 56, stopping motor 50, and sheave 35 is again disconnected from belt A which then can be removed, the weights 31 again dropping to rest upon the floor.

During the time belt A was rotating upon the sheaves 20 and 35, the operator observed the position of the hand indicator 30 and noted whether it remained at the neutral position, in which case the belt A was known to be of exactly proper size, or whether the hand 30 moved to the right or to the left of neutral and the extent of such movement, thus giving indication preferably in units of circumferential peripheral length, of the excess or insufficiency of the belt length. Such indication is marked upon the belt by the operator, and later belts of similar markings can be matched together for use in the same installation with assurance that their lengths and stretch characteristics at such lengths are substantially the same.

Variations may be made without departing from the scope of the invention as it is defined by the following claims.

We claim:

1. Belt-measuring apparatus comprising a pair of sheaves mounted for movement of one with relation to the other, means for applying a weight to the movable sheave for loading a belt upon the same, the other said sheave being movable from slack position to a belt tightening position, means for moving the last-mentioned sheave between the slack position and the belt tightening position thereof, and means controlled by such movement for rotating said sheave whereby both sheaves and the belt are rotated through a limited number of revolutions.

2. Belt-measuring apparatus comprising a support, a carriage mounted for movement along said support, means for adjustably holding said carriage on said support at determinate positions thereon, a second carriage mounted for movement along said support toward and away from the first said carriage, means for urging said second carriage away from the first said carriage, a sub-carriage mounted for movement along the first said carriage between a slack belt position and a taut belt position, means for moving said sub-carriage from one of said positions to the other, and a pair of sheaves mounted for rotation on the said second carriage and said sub-carriage.

3. Apparatus for measuring the pitch circumference of a side-driving V-belt, said apparatus comprising a driving pulley and a driven pulley, said pulleys having aligned V-grooves for engaging a belt to be tested by contact with its driving faces, movable means for supporting the driven pulley for free rotation throughout a range of positions with relation to the driving pulley, means operative within said range for applying a belt-tensioning load to the driven pulley, means for rendering said tensioning means ineffective beyond said range, means for indicating the position of the driven pulley within said range, means for adjustably positioning the driving pulley, means associated with the driving pulley for driving it at any position of adjustment, and means for temporarily shifting the driving pulley from a position of adjustment for driving purposes to a position relieving the belt from tension to permit changing belts.

4. Apparatus for measuring the pitch circumference of a side-driving V-belt, said apparatus comprising a driving pulley and a driven pulley, said pulleys having aligned V-grooves for engaging a belt to be tested by contact with its driving faces, movable means for supporting the driven pulley for free rotation throughout a range of positions with relation to the driving pulley, means operative within said range for applying a belt-tensioning load to the driven pulley, means for rendering said tensioning means ineffective beyond said range, means for indicating the position of the driven pulley within said range, means for adjustably positioning the driving pulley, means associated with the driving pulley for driving it at any position of adjustment, means for temporarily shifting the driving pulley from a position of adjustment for driving purposes to a position relieving the belt from tension to permit changing belts, and means for automatically discontinuing the driving of said driven pulley when the pulley is at the tension-relieving position.

EDWARD L. SCHICK.
JAMES E. ASHWORTH.